Jan. 31, 1933.   R. F. KUNS   1,895,933
CAMPING TRAILER
Filed May 7, 1932   3 Sheets-Sheet 1
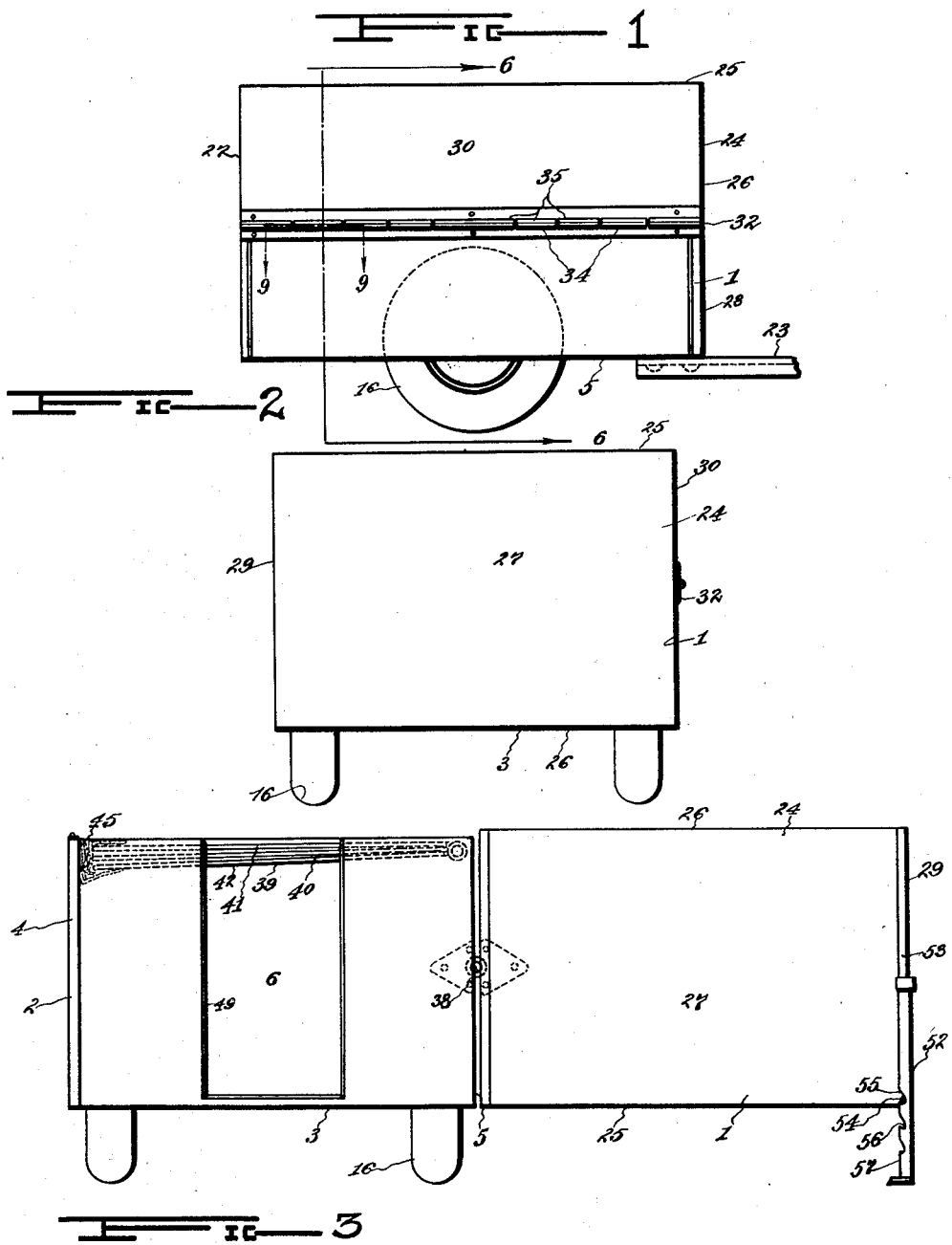
INVENTOR.
Ray. F. Kuns
BY
ATTORNEY.

Jan. 31, 1933. R. F. KUNS 1,895,933
CAMPING TRAILER
Filed May 7, 1932 3 Sheets-Sheet 2
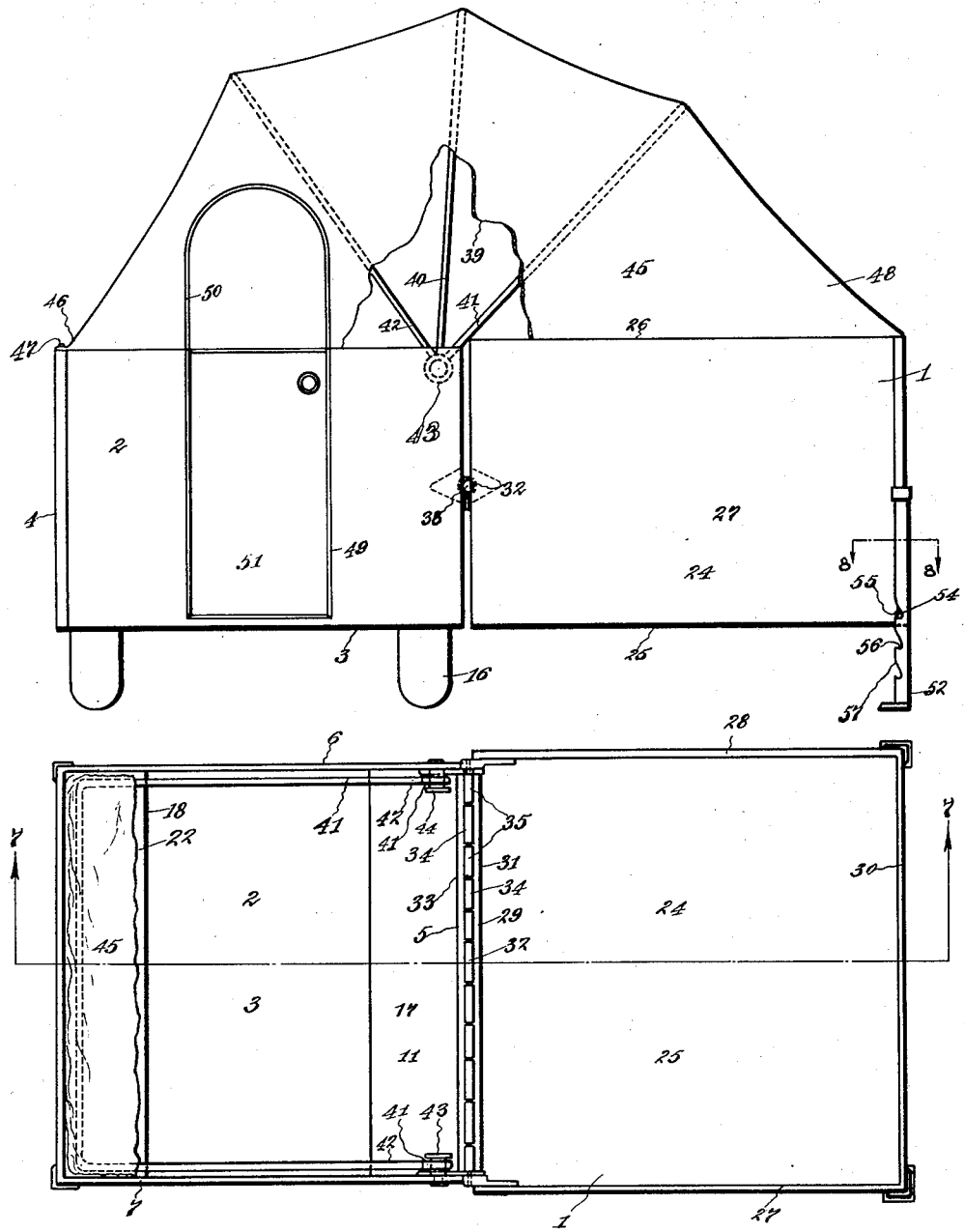
INVENTOR.
Ray F. Kuns
BY
ATTORNEY.

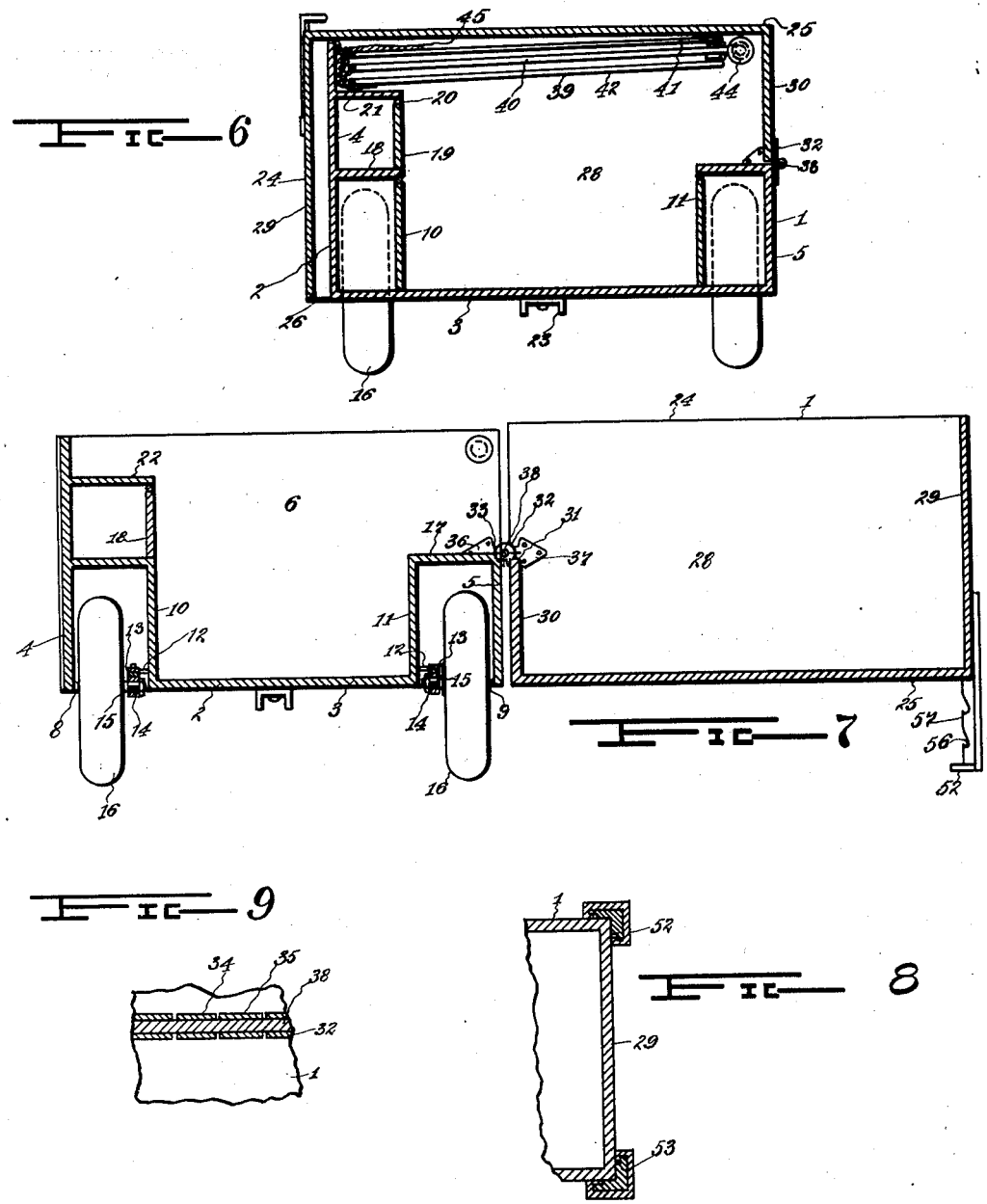

Patented Jan. 31, 1933

1,895,933

UNITED STATES PATENT OFFICE

RAY F. KUNS, OF MADISONVILLE, OHIO

CAMPING TRAILER

Application filed May 7, 1932. Serial No. 609,919.

The invention relates to improvements in portable camping trailers adapted to be pulled over highways by automobiles.

Heretofore, the desire of all tourists, who camp out, is utilization of a trailer which may be readily and conveniently unfolded for the purpose of providing shelter, and large area of floor space for containing cots, a table, cabinets and other necessary paraphernalia. It is well known that two-wheeled trailers, of either the type which has a high center of gravity, or unusual width, is a common source of danger when being towed by an automobile traveling at a high rate of speed. Therefore, it is primarily desirable to place the center of gravity of a trailer, and its load, as low as consistently possible which eliminates, or considerably reduces, the risk of the trailer upsetting. A low over all height which makes possible the normal use of a rear vision mirror is a desirable safe driving feature. Also, it is highly desirable that the width of the trailer shall be approximately, or less, than the width of the automobile to which it is attached. Otherwise, the trailer is a continuous source of danger since its sides extend beyond the body line of the towing automobile and are likely to collide with oncoming automobiles or other obstacles in or at the side of the highway.

On the other hand, it is undesirable that the floor space of a trailer, when utilized for shelter, be small for the reason that a shelter having small floor space is inconvenient and uncomfortable when used for cooking or as living quarters. In fact, it has been determined that a trailer having floor space of less than approximately 100 square feet is insufficiently large to afford comfort and convenience to travelers or campers who desire to sleep and live therein.

For these various reasons, it is desirable to provide a trailer that is small and compact, and which has a low center of gravity, when it is being towed over the highways, and also to provide means whereby when said trailer is stationary, and being utilized for shelter and living quarters, that the area of the floor is relatively great for purposes herein previously explained.

Therefore, the general object of the invention is to provide a simple, efficient, practical and durable camping trailer which is compact when being towed over the highways, and having means whereby it may be unfolded or opened for the purpose of providing ample floor space when utilized for shelter and living quarters.

Other objects of the invention are to provide means whereby the body portion of said trailer, to which the bearing wheels are attached, is relatively narrow and compact; to provide, attached to said body portion, a lid having sides and ends which when closed is adapted to telescope over said body portion and in close proximity thereto; to provide said lid portion with hinged connection with said body portion along a side line which is substantially half the major side and end height of the body portion, or substantially equal distant from the bottom of the body portion and the top of the lid portion, whereby when said lid portion is in open position the inside top of said lid portion is utilized as a floor and is substantially in horizontal alignment with the bottom of said body portion, an arrangement whereby walls of substantial height and construction are provided on all edges of the floor area, and a partition is formed between said bottom of said body portion and said top of said lid portion; and to provide foldable means within said body portion adapted to be utilized as a cover or top of the shelter provided when said trailer is in open position, said cover or top being attached by suitable means to the upper edges of the walls of the opened trailer.

Other objects of the invention will be apparent by reference to the drawings, the hereinafter descriptive matter, and the claims.

The invention consists in providing a body portion having carrying wheels attached thereto, said body portion having hingedly connected therewith a lid portion which when in closed position telescopes said body portion and in close proximity therewith, said lid portion being hingedly attached with said body portion in such a manner that when said lid is in open position a walled shelter is formed and the inside top of said lid is utilized as a floor which is substantially in horizontal alignment with the floor of said body portion, whereby the floor space of the shelter is more than twice as great as the area of the floor of said body portion.

The invention, also, consists in the combination of the elements, arrangement of the parts and in the details of the construction, as hereinafter claimed.

In the drawings:

Fig. 1 is a side elevational view of the invention, shown in closed position, with parts broken away;

Fig. 2 is a rear elevational view of the invention, shown in closed position;

Fig. 3 is a rear elevational view of the invention, shown in open position, with the tent frame in folded position;

Fig. 4 is a rear elevational view of the invention, shown in open position and with the tent frame in unfolded position, with parts broken away;

Fig. 5 is a plan elevational view of the invention shown in open position with the tent frame in folded position;

Fig. 6 is a transverse sectional view taken on a line corresponding to 6—6 in Fig. 1;

Fig. 7 is a transverse sectional view taken on a line corresponding to 7—7 in Fig. 5, with the tent frame removed;

Fig. 8 is a section taken on a line corresponding to 8—8 in Fig. 4, with parts broken away; and Fig. 9 is a section taken on a line corresponding to 9—9 in Fig. 1, with parts broken away.

In the preferred construction of the portable trailer 1 I provide the inner body portion 2 comprising the horizontal floor or bottom 3, vertical side 4 and half height side 5, vertical front end 6 and vertical rear end 7. In the bottom 3 are the openings 8 and 9 having secured therearound the wheel housings 10 and 11. Secured to the body 2 are the spring shackles 12 having mounted thereon the usual springs 13 having secured thereto the usual saddles 14 having the wheel shafts or spindles 15 received therethrough on which the carrying wheels 16 are mounted.

The top 17 of the wheel housing 11 may be utilized as a shelf, or other purposes suitable for use of campers. Above the wheel housing 10 is constructed the cabinet 18, having the slidable door 19 in its front 20, whereby a compartment 21 is formed for utilization by campers for purposes of storing various articles of food. The top 22 of the cabinet 18 may be utilized as a shelf.

Secured to the front end of the floor 3, or suitable cross members, is the towing pole 23 which may be connected with the rear end of an automobile which may be utilized for towing the trailer from place to place over the highways.

The vertical side 5 is cut away at a point which is approximately half the height of the front end 6, the rear end 7 and the side 4 of the body portion.

The outer body or lid portion 24 comprises the top 25, open bottom 26, rear end 27, front end 28 and the sides 29 and 30. The side 30 is cut away to a point about half the height of either the front end 28, the rear end 27 or the side 29 and has its lower edge 31 connected, as by the hinge 32, with the upper edge 33 of the side 5 of the body portion 2. The hinge 32 comprises loops 34 and 35, respectively, connected with the upper edges of the sides 5 and 30. The supports 36 and 37, connected with the front and rear ends of the body portion 2 and lid 24, support the pin 38 received through the loops, thereby adding an element of considerable strength to the hinging arrangement.

When the trailer is in closed position as shown in Figs. 1, 2 and 6, the inner surfaces of the front end 28, rear end 27 and side 29, of the lid 24, are positioned slightly outwardly of and in close proximity to the outer surfaces of the front end 6, rear end 7 and side 4 of the body portion 2, whereby the width of the trailer, when in closed position, is slightly greater than the width of the body portion 2.

When it is desired to open the trailer manual force is exerted upwardly of the lower edge of the side 29, of the lid portion 24, whereby the lid portion is caused to move upwardly and then downwardly into the position shown in Figs. 3, 4, 5 and 7, with the vertical side 30 of the lid portion adjacent and in parallel relation with the vertical side 5 of the body portion 2. Since the height of the side 5 of the body portion 2 is substantially equal to the height of the side 30 of the lid portion 24, the floor 3, of the body portion, and the inside top 25, of the lid portion, are substantially in horizontal alignment when the trailer is in open position, whereby the inner surface of the top 25, of the lid, may be utilized as a floor thereby increasing the total area of the floor space of the trailer, when in open position, to more than twice the area of the floor 3 of the body portion 2.

For the purpose of providing shelter, and a weatherproof cover, when the lid 24 is in open position, the tent frame or cover 39 is provided and which comprises the U-shape bows 40 having their ends 41 and 42 pivotally connected with the studs 43 and 44, respectively, secured in the rear and front ends 7 and 6 of the body portion 2, and positioned adjacent the upper edge of the body portion at points substantially vertical with reference to the body hinge line. Suitably secured to the bows is the canvas 45, or other suitable material cover, which is adapted to cover the body portion 2 and lid portion 24 when the trailer is in open position. The edge 46, of the canvas 45, is secured to the upper edge of the side 4, of the body portion 2, as by the nail 47. The edge 48, of the canvas, may be secured in the position shown in Fig. 4, when the trailer is in open position, by any suitable means.

Formed in the rear end 7, of the body portion 2, is the doorway 49, in vertical alignment with the aperture 50 in the canvas 45 whereby, when the tent frame is in erected position, as shown in Fig. 4, a convenient means is provided for the entrance and exit of the trailer by opening and closing the door 51 suitably hinged in the doorway.

When it is desired to close the trailer, to the position shown in Figs. 1, 2 and 6, the edge 48, of the canvas cover 45, is released from connection with the upper edge of the side 29, of the lid 24, and the bows 40 are pivoted downwardly towards the side 4, of the body portion 2, to the position shown in Figs. 3, 5 and 6, with the outer ends of the bows in supporting engagement with the top 20 of the cabinet 18.

Suitable means may be provided for supporting the side 29, of the lid portion 24, when the trailer is in open position, such as the angular legs 52 which are slidably mounted on the angular supports 53 fixed to the outer corner of the lid portion. The legs are slidably mounted on the supports 53 and may be secured in any suitable position for supporting the lid portion in desired position as by positioning the pins 54 in the holes 55 and in the suitable notches 56 formed in the edges 57 of the legs.

An advantage of the invention is that the trailer 1, when in closed position, with the lid portion 24 telescoping the body portion 2, as shown in Figs. 1, 2 and 6, the width of the trailer is sufficiently narrow that it may be towed by an automobile without likelihood of the outer side edges of the trailer contacting or colliding with oncoming vehicles or other objects on the highways. Also, the fact that the lid 24 telescopes over the body portion 2 results in the side walls of the trailer having double thickness which adds considerably to the strength of the trailer. Also, a standard wheel track may be used.

Another advantage of the invention is that a relatively small trailer may be utilized which, when the lid 24 is in open position, provides ample floor space and cubical area for containing various articles, such as cots, cabinets, and the like.

Still another advantage of the invention is that the lid 24, when in closed position provides means whereby rain, or other weather elements, are prevented from entering the trailer and damaging commodities stored therein.

Still another advantage of the invention is that since the lid 24 is attached to the body portion 2 by the hinge 32, which is substantially equal distant from the bottom 3, of the body portion and the top 25, of the lid, a partition comprising the sides 5 and 30 is formed between the floor 3, of the body portion, and the top 25 of the lid, when the lid is in open position, thus automatically creating a natural division of the space within the trailer into two rooms, the one in the body portion being most adaptable to kitchen uses and the one in the lid portion to living and bedroom uses.

Still another advantage of the invention is that the tent frame 39 is relatively light weight and may be folded in relatively small space within the trailer when the trailer is in closed position. Moreover, the manual operation of unfolding the cover and tent frame is comparatively simple and provides an adequate and durable cover for the purpose of excluding wind, rain, snow, sleet and other weather elements from within the trailer when the lid 24 is in open position. The tent frame and cover are completely housed within the trailer body when the trailer is closed for traveling.

It is, therefore, quite apparent that I have invented a highly desirable portable camping trailer and shelter which may be utilized with safety when being towed by an automobile, and which provides adequate floor space and cubical area for comfortable utilization as a shelter and for purposes of containing various articles utilized by campers.

It is apparent that I have devised a novel and useful structure, which embodies the features of advantages enumerated, and while I have, in the present instance, shown and described preferred embodiments thereof, which will give in practice satisfactory and reliable results, it is to be understood that the same is susceptible of modification in various particulars. In other words, it is apparent that the parts of the invention may be of any size and constructed of any materials deemed convenient and suitable for an article of this character, and while I have illustrated and described a form of construction and arrangement of the elements found desirable in materializing the invention, I wish to emphasize the fact that I desire to include in this application, all equivalents and substitutes that may fairly be considered to come within the scope and purview of the invention as defined in the claims.

What I claim as new and desire to secure by Letters Patent is:

1. In a portable shelter, a body portion having a floor, a lid portion having a top and having hinged connection with said body and adapted to be opened and closed, said connection being substantially equal distance from said bottom and said top, whereby when said lid is in open position said top is adapted to be substantially in horizontal alignment with said bottom, the area of said top being slightly larger than the area of said bottom whereby when said lid is in open position the floor space of said shelter is more than twice the area of said body portion floor and said lid is adapted to telescope over said body portion when in closed position.

2. In a portable shelter, a body portion having sides, ends and a floor, a lid having sides, ends and a top and having hinged connection with said body and adapted to be opened and closed, said connection being substantially equal distance from said bottom and said top, the area of said top being slightly larger than the area of said bottom whereby when said lid is in open position the floor space of said shelter is more than twice the area of said body portion floor.

3. A camping trailer having a body portion having carrying wheels, a lid adapted to be opened and closed and being hingedly connected with said body portion along a line substantially equal distance from the bottom of said body portion and the top of said lid whereby, when said lid is open, the inner surface of said top of said lid is substantially in alignment with the inner surface of said bottom of said body portion and said lid is adapted to telescope said body portion when said lid is closed whereby the width of said closed trailer is only slightly greater than the width of said body portion, and a folded tent frame mounted within said body portion at a point substantially in vertical alignment with said hinge and adapted when unfolded to cover said trailer when in open position.

4. A camping trailer having a body portion having carrying wheels, a lid adapted to be opened and closed and being hingedly connected with said body portion along a line substantially equal distance from the bottom of said body portion and the top of said lid whereby, when said lid is open, the top of said lid is substantially in alignment with the bottom of said body portion.

5. A camping trailer having a body portion having carrying wheels, a lid adapted to be opened and closed and being hingedly connected with said body portion along a line substantially equal distance from the bottom of said body portion and the top of said lid whereby, when said lid is open, the inner surface of said top of said lid is substantially in alignment with the inner surface of said bottom of said body portion and said lid is adapted to telescope said body portion when said lid is closed whereby the width of said closed trailer is only slightly greater than the width of said body portion.

6. A camping trailer adapted to be opened and closed and comprising an inner body portion having a bottom and having supporting wheels, an outer body portion having a top and hingedly connected with said inner body portion along a line substantially half the height of said inner body portion, said outer body portion being sufficiently larger than said inner body portion that said outer body portion will telescope over said inner body portion when said trailer is in closed position, whereby the width of said trailer in closed position is only slightly larger than the width of said inner body portion, and the width of said trailer when in closed position is slightly more than half the width of said trailer when in open position and said outer body portion being hingedly connected with said inner body portion along said line, the normal top of said outer body portion is substantially in horizontal alignment with said bottom when said trailer is in open position, whereby the normal top of said outer body portion and the bottom of said inner body portion may be utilized as a floor, and a partition is formed intermediate said inner body portion and said outer body portion when said trailer is in open position.

7. A camping trailer adapted to be opened and closed and comprising an inner body portion having a bottom and having supporting wheels, an outer body portion having a top and hingedly connected with said inner body portion along a line substantially half the height of said inner body portion, said outer body portion being sufficiently larger than said inner body portion that said outer body portion will telescope over said inner body portion when said trailer is in closed position, whereby the width of said trailer in closed position is only slightly larger than the width of said inner body portion, and said outer body portion being hingedly connected with said inner body portion along said line, the normal top of said outer body portion is substantially in alignment with said bottom when said trailer is in open position, whereby the normal top of said outer body portion and the bottom of said inner body portion may be utilized as a floor when said trailer is in open position.

8. A camping trailer adapted to be opened and closed and comprising an inner body portion having a bottom and having supporting wheels, an outer body portion having a top and hingedly connected with said inner body portion along a line intermediate said bottom of said outer and the top of said inner body portion, said outer body portion being sufficiently larger than said inner body portion that said outer body portion will telescope over said inner body portion when said trailer is in closed position, whereby the width of said trailer in closed position is only slightly larger than the width of said inner body portion, and the width of said trailer when in closed position is slightly more than half the width of said trailer when in open position and said outer body portion being hingedly connected with said inner body portion along said line, the normal top of said outer body portion and the bottom of said inner body portion may be utilized as a floor, and a partition is formed intermediate said inner body portion and said outer body portion when said trailer is in open position.

9. A camping trailer adapted to be opened and closed and comprising an inner body portion having a bottom and having supporting wheels, an outer body portion having a top and hingedly connected with said inner body portion along a line intermediate said bottom of said outer and the top of said inner body portion, said outer body portion being sufficiently larger than said inner body portion that said outer body portion will telescope over said inner body portion when said trailer is in closed position, whereby the width of said trailer in closed position is only slightly larger than the width of said inner body portion, and said outer body portion being hingedly connected with said inner body portion along said line, the normal top of said outer body portion and the bottom of said inner body portion may be utilized as a floor when said trailer is in open position.

10. A camping trailer adapted to be opened and closed and comprising an inner body portion having a bottom and having supporting wheels, an outer body portion having a top and hingedly connected with said inner body portion along a line intermediate said bottom of said outer and the top of said inner body portion, said outer body portion being sufficiently larger than said inner body portion that said outer body portion will telescope over said inner body portion when said trailer is in closed position, whereby the width of said trailer in closed position is only slightly larger than the width of said inner body portion, and said outer body portion being hingedly connected with said inner body portion along said line, the normal top of said outer body portion and the bottom of said inner body portion may be utilized as a floor when said trailer is in open position, and a tent frame mounted within said inner body portion.

RAY F. KUNS.